US012779732B2

(12) United States Patent
Miller et al.

(10) Patent No.: US 12,779,732 B2
(45) Date of Patent: Nov. 3, 2026

(54) CONCRETE BLOCK WITH SMOOTH TEXTURE FRONT FACE

(71) Applicant: E. Dillon & Company, Sword Creek, VA (US)

(72) Inventors: Christopher Michael Miller, Honaker, VA (US); Thomas Harris, Rosedale, VA (US)

( * ) Notice: Subject to any disclaimer, the term of this patent is extended or adjusted under 35 U.S.C. 154(b) by 98 days.

(21) Appl. No.: 18/831,134

(22) Filed: Aug. 10, 2024

(65) Prior Publication Data

US 2025/0033244 A1 Jan. 30, 2025

Related U.S. Application Data

(62) Division of application No. 17/844,700, filed on Jun. 20, 2022, now Pat. No. 12,059,821, which is a division of application No. 16/247,073, filed on Jan. 14, 2019, now Pat. No. 11,389,989.

(51) Int. Cl.
*B28B 7/28* (2006.01)
*B28B 7/00* (2006.01)
*B28B 7/24* (2006.01)

(52) U.S. Cl.
CPC ............ *B28B 7/241* (2013.01); *B28B 7/0097* (2013.01); *B28B 7/28* (2013.01)

(58) Field of Classification Search
CPC ... E02D 29/0266; E02D 29/025; E02D 29/02; E04C 1/395; E04B 2002/0269
See application file for complete search history.

(56) References Cited

U.S. PATENT DOCUMENTS 4,993,206 A * 2/1991 Pardo .................... E02D 29/025 52/591.4
D451,207 S * 11/2001 Risi .............................. D25/113
6,978,580 B1 * 12/2005 Clark ...................... E04C 1/395 52/603
7,963,727 B1 * 6/2011 Wauhop .............. E02D 29/0266 52/603
10,513,834 B2 * 12/2019 Amrein ................. E02D 29/025
11,401,714 B2 * 8/2022 LaCroix .................. B28B 3/021
2007/0193183 A1 * 8/2007 Price ....................... E04C 1/395 52/596
2010/0284751 A1 * 11/2010 Price ....................... E04C 1/395 52/607

* cited by examiner

*Primary Examiner* — Basil S Katcheves
*Assistant Examiner* — Daniel J Kenny

(57) ABSTRACT

A mold assembly and method for molding two concrete blocks in face-to-face non-contacting relationship forms blocks having smooth texture front faces. The mold assembly includes a mold box having two mold cavities configured to form two blocks in face-to-face non-contacting relationship. A common partition plate separates the two mold cavities and opposite sides of the partition plate form the smooth front faces of the blocks. The two mold cavities are each configured to form a block having a raised front face with a beveled edge around its entire perimeter and a border around the entire perimeter of the beveled edge. The portions of the border at the top and the sides of the raised front face are curved and the portion of the border at the bottom of the raised front face is straight. A core bar is slidably inserted into the mold box beneath the bottom of the partition plate, and opposite sides of the core bar extend into and form the front bottom portions of the mold cavities.

14 Claims, 7 Drawing Sheets

CONCRETE BLOCK WITH SMOOTH TEXTURE FRONT FACE

BACKGROUND

Field

The present disclosure relates generally to a mold assembly for molding in one production cycle two concrete blocks in face-to-face non-contacting relationship, a method of manufacturing concrete blocks, and a concrete block with a smooth texture front face.

Background Information

Retaining walls are used in various landscaping projects. Typically, they are used to maximize or create level areas and also to reduce erosion and slumping. They may also be used in a purely decorative manner. In recent years, segmented concrete retaining wall blocks, which are dry stacked without the use of mortar, have become widely accepted in the construction of retaining walls.

Typically, retaining walls are constructed with multiple courses of blocks. More recently, retaining wall construction has become significantly simplified with the introduction of self-aligning blocks that may be stacked in courses without the use of mortar or extensive training. With these types of retaining wall blocks, it is possible to erect a retaining wall quickly and economically, and the erected retaining wall creates the appearance of a conventional block-and-mortar retaining wall.

In the manufacture of retaining wall blocks on a commercial scale, a common practice in the industry has been to mold the blocks as paired units in which two blocks are molded in face-to-face contact as a single unit and after curing, the paired blocks are mechanically split apart at their adjoining faces to form two individual blocks having rough fracture surfaces which resemble the appearance of a “split” rock. The rough fracture surfaces on the front faces of split blocks may be aesthetically pleasing in some applications, however other applications prefer or even require blocks having smooth front faces. Also, when splitting paired blocks, it is difficult to create distinct, uniform boundaries around the perimeters of the split faces, which detracts from the aesthetic appearance of retaining walls erected with split blocks.

SUMMARY OF DISCLOSURE

This disclosure relates to an improved mold assembly and method for molding two concrete blocks in face-to-face non-contacting relationship to form blocks having smooth front faces.

In accordance with one aspect of this disclosure, two mold cavities are configured to form two blocks in face-to-face non-contacting relationship, wherein a common partition plate separates the two mold cavities and opposite sides of the partition plate form the smooth front faces of the blocks.

According to another aspect, each mold cavity is configured to form a beveled edge around the entire perimeter of the smooth front face to form a block having a raised front face.

According to another aspect, each mold cavity is configured to form a border around the entire perimeter of the beveled edge of the block to enhance the three-dimensional effect created by the raised front face.

According to a further aspect, the two mold cavities are each configured to form a block having a raised front face with a beveled edge around its entire perimeter and a border around the entire perimeter of the beveled edge. The portions of the border at the top and the sides of the raised front face are curved and the portion of the border at the bottom of the raised front face is straight.

In accordance with another aspect, a method of molding two concrete blocks in face-to-face non-contacting relationship includes providing a mold box having two face-to-face mold cavities that are mirror images of one another. The mold cavities are separated by a partition plate having opposite smooth surfaces that conform to smooth front faces of blocks formed in the mold cavities. The mold cavities are placed on a pallet which closes the open bottoms of the mold cavities after which the mold cavities are filled with a dry cast concrete mixture. A stripper shoe assembly attached to a compression head is situated above the open tops of the mold cavities, and the compression head is lowered to insert stripper shoes into the open tops of the mold cavities to compact and densify the concrete mixture. After densification, blocks having smooth front faces are discharged from the mold cavities and transported to another location for curing.

According to another aspect, a core bar is slidably inserted into the mold box beneath the bottom of the partition plate, and opposite sides of the core bar extend into and form the front bottom portions of the mold cavities. The core bar sides are configured to form blocks having straight edges at the bottoms of the raised front faces. The side portions of the mold cavities are configured to form curved edges at opposite sides of the raised front faces, and the bottom surfaces of the stripper shoes are configured to form curved edges at the tops of the raised front faces.

DETAILED DESCRIPTION

Figure 1:
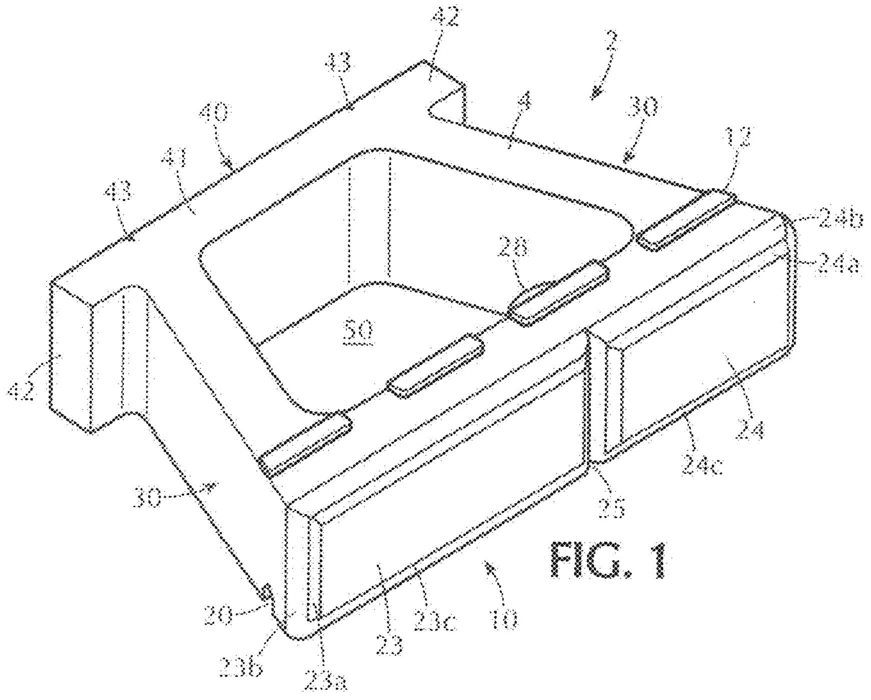
FIG. 1 is a top, front perspective view of one embodiment of a retaining wall block made in accordance with principles of this disclosure.

The figures in the drawings are simplified for illustrative purposes and are not necessarily depicted to scale. In some figures, parts have been enlarged relative to other parts to facilitate describing and understanding this disclosure. The same reference numerals have been used, where possible, to designate identical elements that are common to the figures, except that suffixes may be added, when appropriate, to differentiate such elements. The drawings and written description omit describing some parts that are well known in the industry and not needed for understanding this disclosure in order to simplify a reading and understanding of this disclosure.

The drawings illustrate exemplary embodiments of the disclosure and, as such, should not be considered as limiting the scope of the disclosure that may admit to other effective embodiments. It is contemplated that features or steps of one embodiment may be beneficially incorporated in other embodiments without further recitation.

The term "exemplary" is used herein to mean "serving as an example, instance, or illustration". Any embodiment or design described herein as "exemplary" or "alternative" is not necessarily to be construed as preferred or advantageous over other embodiments or designs.

The present disclosure relates to a mold assembly for molding two concrete blocks in face-to-face non-contacting relationship and to a method of manufacturing concrete blocks. While the following description relates to dry cast retaining wall blocks, it is understood that the disclosure is not limited thereto and may be applicable to forming other types of concrete blocks. Unlike prior art techniques in which two blocks are molded in face-to-face contact as a paired unit, sometimes referred to as "Siamese" twins, and then split apart at their joined front faces to form two individual blocks having rough fracture surfaces, this disclosure describes forming two individual blocks in face-to-face relationship in which the front faces of the blocks are spaced apart and not joined together, thereby obviating the need for splitting them apart and simplifying formation of blocks having smooth front faces.

Figure 2:
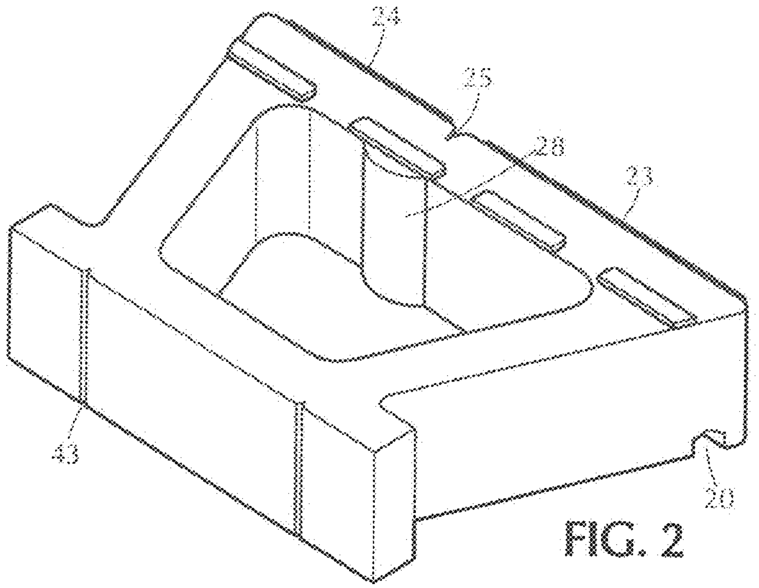
FIG. 2 is a top, rear perspective view of the block shown in FIG. 1.
Figure 3:
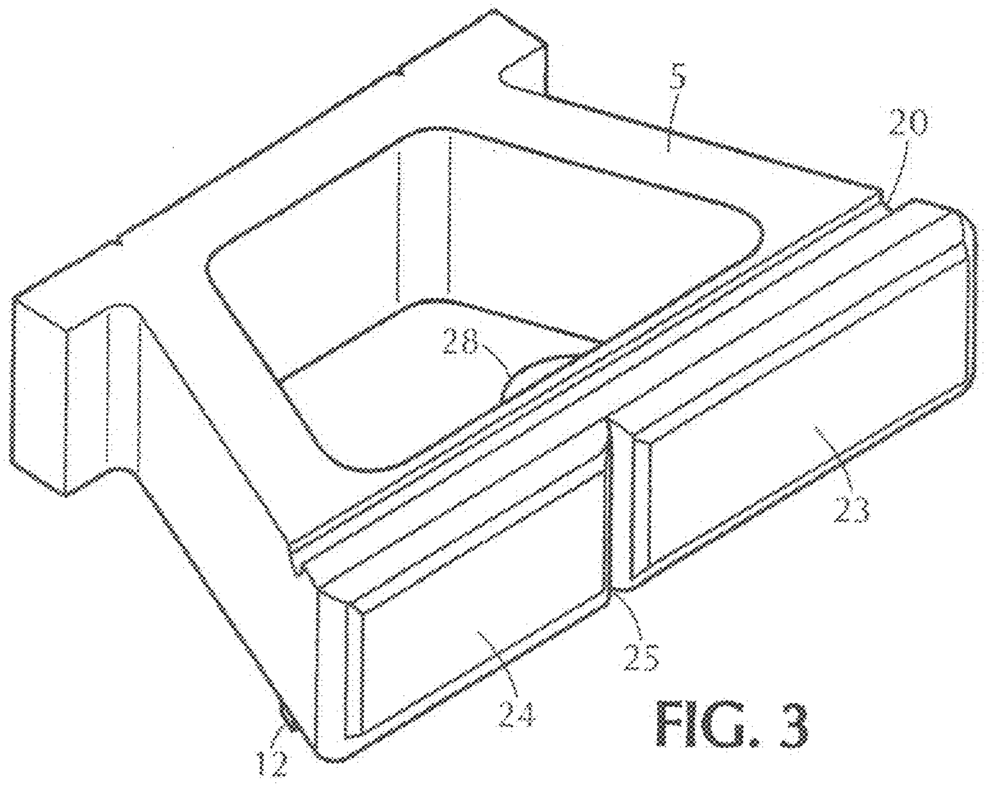
FIG. 3 is a bottom, front perspective view of the block shown in FIG. 1.

FIGS. 1-3 show one embodiment of a dry cast retaining wall block 2 (hereinafter sometimes referred to as simply "block") according to principles of this disclosure. The block 2 has a front section 10, two side sections 30,30 and a rear section 40. The front section 10 and the rear section 40 are spaced apart from one another and interconnected by the side sections 30,30. The interconnected front, side and rear sections define a center through-cavity 50 that extends completely through the block 2 from a top face 4 of the block to a bottom face 5. The rear section 40 has a main part 41 and two lateral extension parts 42 that extend outwardly from the main part 41. The rear face of the rear section 40 is provided with score grooves 43 that extend from the top face 4 to the bottom face 5. The score grooves 43 are provided to enable removal of one or both of the lateral extension parts 42, such as may be required when installing a retaining wall having a curvilinear section. The extension parts 42 can be removed on site by striking them with a hammer so that they break away from the main part 41 along the score grooves 43 and separate from the block 2 at the region where the extension parts 42 meet with the side sections 30.

As shown in FIGS. 1-2, the top face 4 of the block 2 is provided with protuberances 12 which, in this embodiment, are lugs that have a generally rectangular shape. While four protuberances 12 are illustrated in this example, the number is not limited to four and may be more than or less than four. As shown in FIG. 3, the bottom face 5 of the block is provided with a groove 20 that extends widthwise across the entire bottom face 5. The groove 20 is located and dimensioned relative to the protuberances 12 so that two blocks 2 can be stacked one atop another in staggered relation with one or more protuberances of the lower block interlocked in the groove of the upper block so that the upper block is set back with respect to the lower block. In erecting a retaining wall using the retaining wall blocks 2, the blocks in a first course are laid in side-by-side abutting relation, and the blocks in a subsequent upper course are laid in the same way but laterally staggered from the blocks in the first course so that in each successive course, each upper block overlaps two adjacent lower blocks in the course directly below and each upper block is interlocked with two adjacent lower blocks.

In the embodiment illustrated in FIGS. 1-3, the front face of the front section 10 is provided with a split panel that divides the front face into two panels 23 and 24 of different widths by a groove 25 that extends in the top-bottom direction of the block. The groove 25 constitutes a manufactured dress joint or simulated joint that simulates the actual joints between adjacent panels of laterally abutting blocks in an erected retaining wall. To preserve the structural integrity of the block 2 due to the presence of the groove 25, the rear side of the front section 10 has a protruding portion 28 in the region directly behind the groove 25. The protruding portion 28 protrudes into the through-cavity 50 and, like the groove 25, extends in the top-bottom direction from the top surface 4 to the bottom surface 5 of the block 2.

Retaining wall blocks of this general type are disclosed in U.S. Pat. No. 7,963,727 assigned to E. Dillon & Company, which is incorporated herein by reference in its entirety. The blocks disclosed in this patent are molded in paired units, with the front sections of both blocks of each paired unit joined along an imaginary interface in face-to-face relation. After curing, grooves are formed, for example, by grinding, in the bottom surfaces of the joined blocks following which each paired block unit is split into two individual blocks. The splitting process forms a rough textured surface on the front faces of the blocks. The front face of each panel terminates at the top and at opposite sides in curved edges and terminates at the bottom in a flat edge. The front faces of the blocks are divided into two panels of different widths and the front faces of the panels have rough fracture surfaces due to their formation by splitting. The bottoms of the panels terminate at the bottom surfaces of the blocks with no border at the bottom marginal edge portions of the panels.

Unlike the method of forming retaining wall blocks disclosed in U.S. Pat. No. 7,963,727 in which the blocks are molded in paired units and then split to form individual blocks, this disclosure relates to molding two blocks in face-to-face relationship using a common partition plate that separates the two mold cavities and that forms the smooth front faces of the blocks.

To facilitate a description of the mold assembly in accordance with aspects of this disclosure, a description will first be given of features of the blocks 2 that are formed by the mold assembly: As shown in FIGS. 1-3, the perimeters of the front faces of the panels 23,24 are surrounded by beveled surfaces 23*a*, 24*a*, and the beveled surfaces are bordered on the top and sides by curved edge portions 23*b*, 24*b* and on the bottom by flat edge portions 23*c*, 24*c* which face frontward as shown in FIG. 1. That is, the panels 23, 24 have beveled edges 23*a*, 24*a* around their entire perimeters, and the beveled edges are surrounded around their entire perimeters by a curved border 23*b*, 24*b* at their tops and both sides and by a front-facing flat border 23c, 24c at their bottoms.

The front faces of the panels 23,24 are raised with respect to the borders by an amount equal to the thickness of the beveled edges 23*a*,24*a*. By way of example, it has been found that for 18-inch wide blocks (blocks whose front surface measures 18 inches from side to side), beveled edges having a thickness of 0.25 inch raise the front face of the block a sufficient distance from the surrounding border to achieve a pronounced three-dimensional appearance. This thickness, of course, is not a requirement and this disclosure is applicable to blocks whose raised front faces have thicknesses greater or less than 0.25 inch, preferably in the range 0.20 inch to 0.30 inch, as well as to blocks of different sizes and dimensions. Further by way of example, the curved borders at the tops and both sides of the panels 23,24 and the straight borders at the bottoms of the panels have widths substantially greater than the thickness of the the beveled edges, preferably widths in the range 0.40 inch to 0.55 inch for 18-inch wide blocks. The widths of the borders are measured in the vertical plane of the panel front faces, i.e., in a direction perpendicular to the thickness direction of the beveled edges. When retaining wall blocks 2 are stacked in courses one atop another to erect a retaining wall, the raised front faces noticeably stand out in relief from their surrounding borders creating an aesthetic three-dimensional effect. As described hereinafter, the front faces of the panels 23,24 have a smooth texture because they are formed by the smooth surfaces of the partition plate during molding and not by splitting.

Figure 4:
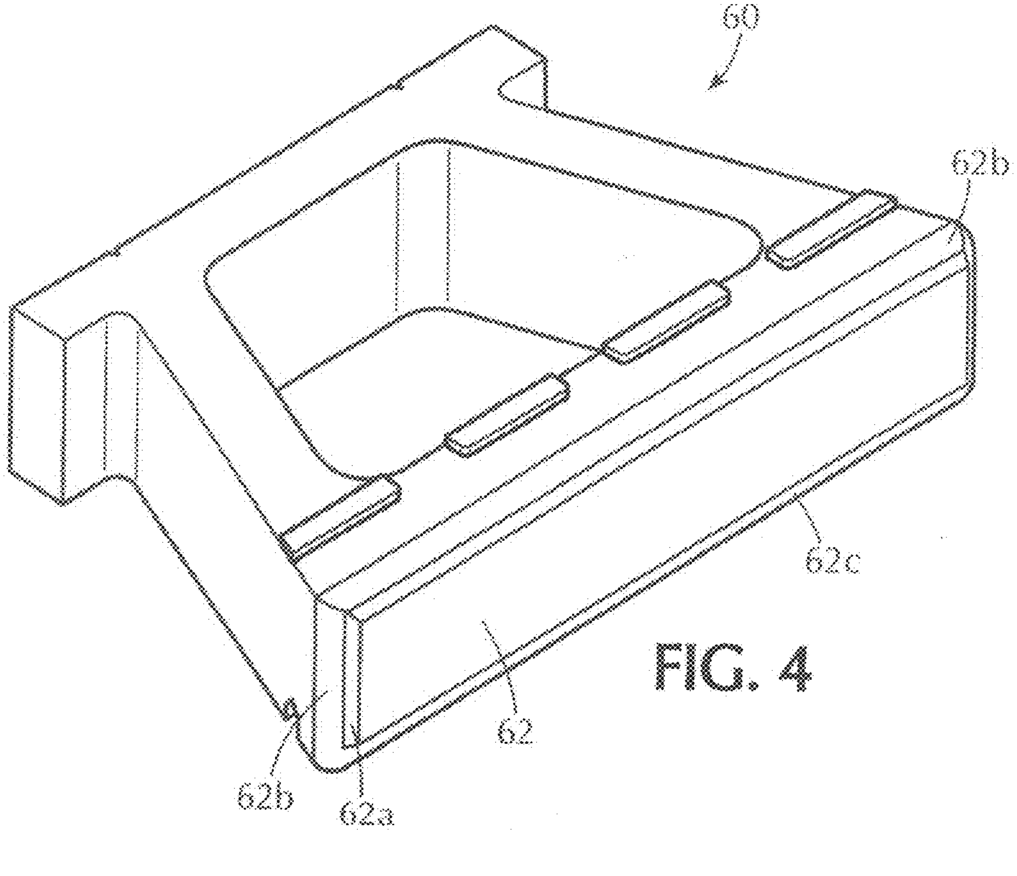
FIG. 4 is a top, front perspective view of another embodiment of a retaining wall block made in accordance with principles of this disclosure.

FIG. 4 is a top, front perspective view of another embodiment of a retaining wall block 60, This embodiment is the Same as the embodiment shown in FIGS. 1-3 except that the block 60 has a single panel 62 instead of a split panel. The front face of the panel 62 is surrounded by a beveled surface 62*a*, and the beveled surface is bordered at its top and both sides by a curved edge portion 62*b* and at its bottom by a front-facing flat edge portion 62*c*. That is, the front face of the panel 62 has a beveled edge 62*a* around its entire perimeter, and the beveled edge is surrounded by a border 62*b*, 62*c* around its entire perimeter. The front face of the panel 62 is raised relative to the border by an amount equal to the thickness of the beveled edge 62*a*. When retaining wall blocks 60 are stacked in courses one stop another to erect a retaining wall, the front faces project in relief from the surrounding borders creating a conspicuous three-dimensional effect, Unlike conventional paired block units which, after curing, are split apart to form two individual blocks having rough front faces, the retaining wall blocks 60 are molded in face-to-face relation but not in contact with one another so that the blocks can be molded with front faces having a smooth texture.

Figure 5:
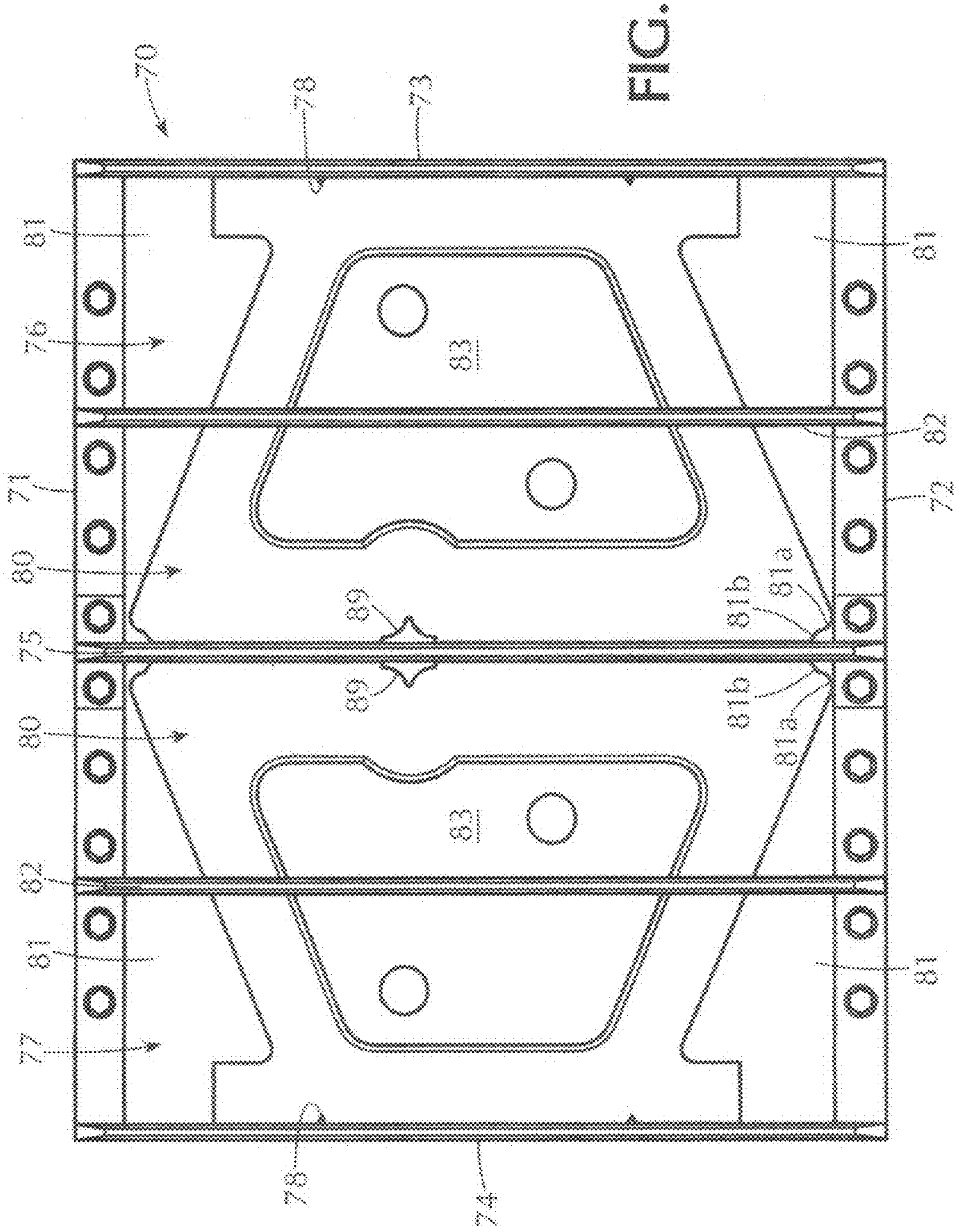
FIG. 5 is a top plan view of one embodiment of a mold box made in accordance with principles of this disclosure.
Figure 6:
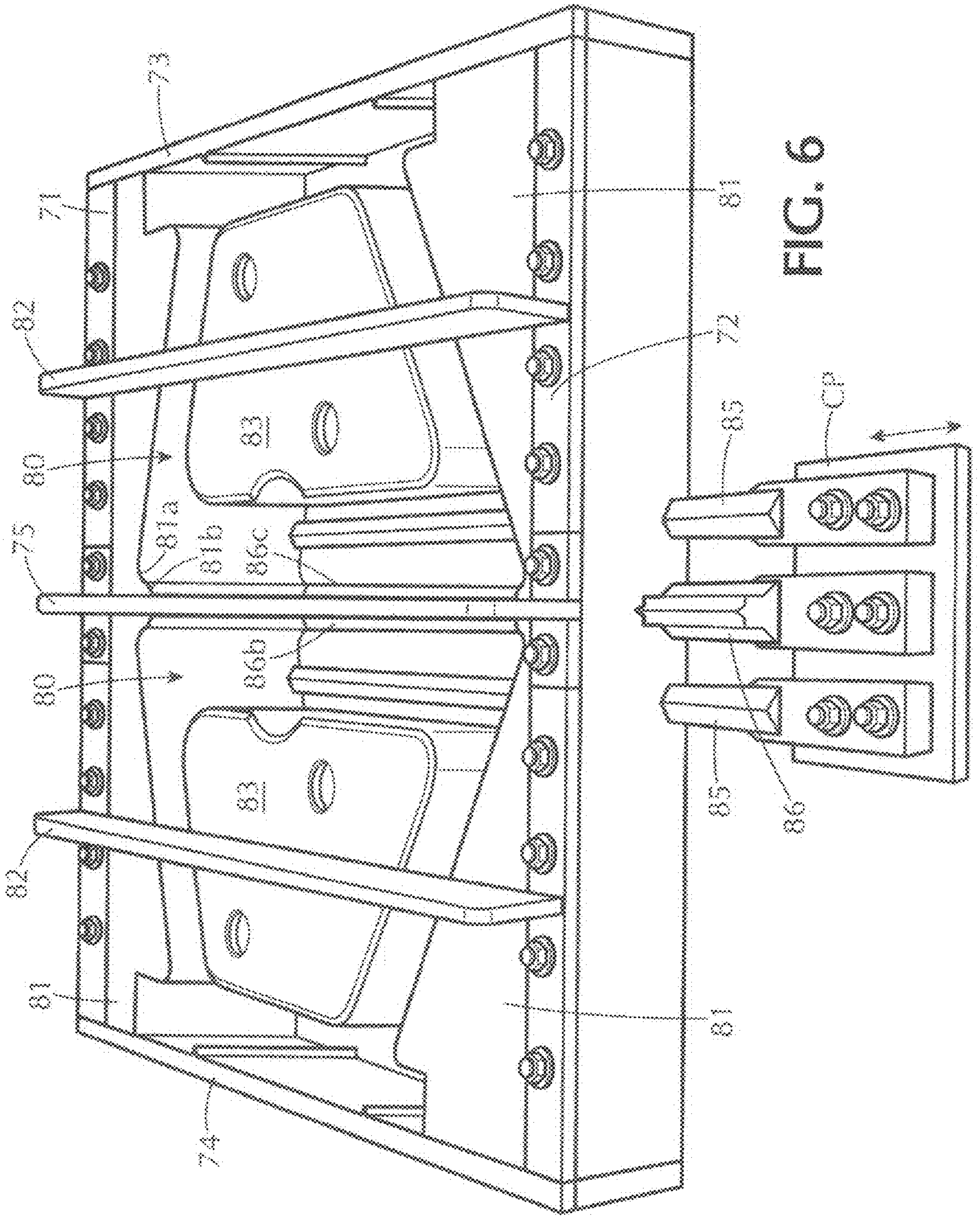
FIG. 6 is a top, side perspective view of the mold box shown in FIG. 5 showing core bars inserted in the mold box.

One embodiment of a mold assembly for molding block pairs in face-to-face non-contacting relation in accordance with principles of this disclosure is shown in FIGS. 5-9. FIG. 5 is a top plan view of a mold box 70 and FIG. 6 is a top, side perspective view of the mold box with core bars 85,86 inserted therein. The mold box 70 has two opposed side walls 71,72 interconnected by two opposed end walls 73,74. The mold box 70 has an open top and an open bottom. During use, the mold box is placed on a pallet (not shown) which closes the open bottom. A partition plate 75 extends in a lateral or widthwise direction between the two side walls 71,72 and partitions the mold box into two mold compartments 76,77. The partition plate 75 is integrally fixed to the opposed side walls 71,72 and extends downwardly to near the bottom of the mold box. As described below, the partition plate 75 does not extend downward in the mold box 70 to the same extent as the side walls 71,72, and a space exists beneath the partition plate for insertion of a core bar beneath the partition plate to form the bottom portions of the fronts of the mold cavities.

Each mold compartment 76,77 has a mold cavity 80 having a shape that conforms to the outer surfaces of the block molded therein. The two mold cavities 80 are separated by the partition plate 75 and have configurations that are mirror images of one another. In this example, the partition plate 75 has smooth opposite surfaces to form blocks having smooth textured front faces. As used herein, "smooth faces" or "smooth surfaces" of the partition plate 75 refer to the surface texture of the partition plate surfaces and the corresponding surface texture of the front faces or surfaces of the blocks when discharged from the mold cavities 80 with no other device, element or action altering the block front faces or surfaces. The smooth surfaces of the partition plate have a flat and even consistency, free from perceptible projections or indentations, such as weld spots or other surface defects, that could mar the front faces of the blocks so that the block front faces have a smooth and uniform appearance throughout.

Mold parts 81 are provided in the mold compartments 76,77 and have shapes that conform to the shapes of the side surfaces of the blocks. The inner surfaces of the end walls 73,74 have planar shapes that conform to the planar shapes of the rear surfaces of the blocks. The inner surfaces of the end plates 73,74 are provided with vertically extending mold parts 78 configured to form the score grooves 43 on the rear surfaces of the blocks. The mold parts 81 may be formed by machining out a mild steel block, such as by plasma arc cutting or flame cutting, to form the side surfaces of the mold cavities 80, and/or some mold parts may be in the form of machined wear plates or end liners The mold box 70 is provided with two core assemblies, one in each mold compartment 76,77, to form the through-cavities 50 in the blocks. As illustrated in FIGS. 5-6, each core assembly includes a plate member 82 that laterally spans the mold compartment from side to side and is supported by the side walls 71,72. In this embodiment, the ends of the plate members 82 are welded to tabs which are bolted to the side walls 71,72. A core form 83 is welded to the bottom portion of each plate member 82 and suspended from the plate member into the mold compartment. The core form 83 has a shape that conforms to the shape of the through-cavity 50 in the block.

When forming split-face blocks, mold parts 89 are provided on the opposite faces of the partition plate 75 as shown in FIG. 5. The mold parts 89 have been omitted from the partition plate in FIG. 6 to show more clearly the configuration of the mold cavities 80. The mold parts 89 are affixed to the partition plate 75 and have a shape that corresponds to the shape of the simulated dress joint 25 between the panels 23,24. The mold parts 89 each have two curved portions configured to form the opposed curved edge portions 23*b*,24*b* of the simulated joint 25, and two beveled surfaces configured to form the beveled edges 23*a*,24*a* of the simulated joint. When making a full-face panel such as shown in FIG. 4, the mold parts 89 are omitted so that full-face blocks rather than split-face blocks are formed.

In a like manner, the mold parts 81 in the mold compartments 76,77 have shapes that correspond to the shapes of the side surfaces of the blocks and of the corners where the side surfaces meet the front surfaces of the blocks. The mold parts 81 each have curved edge portions 81*a* which have a shape that conforms to the shape of the curved edge portions 23*b*,24*b* at the front corners of the block, and beveled portions 81*b* extending inwardly from the curved corner edge portions 81*a* and which have a shape that conforms to the shape of the beveled edges 23*a*,24*a* at the outer sides of the panels 23,24.

Figure 7:
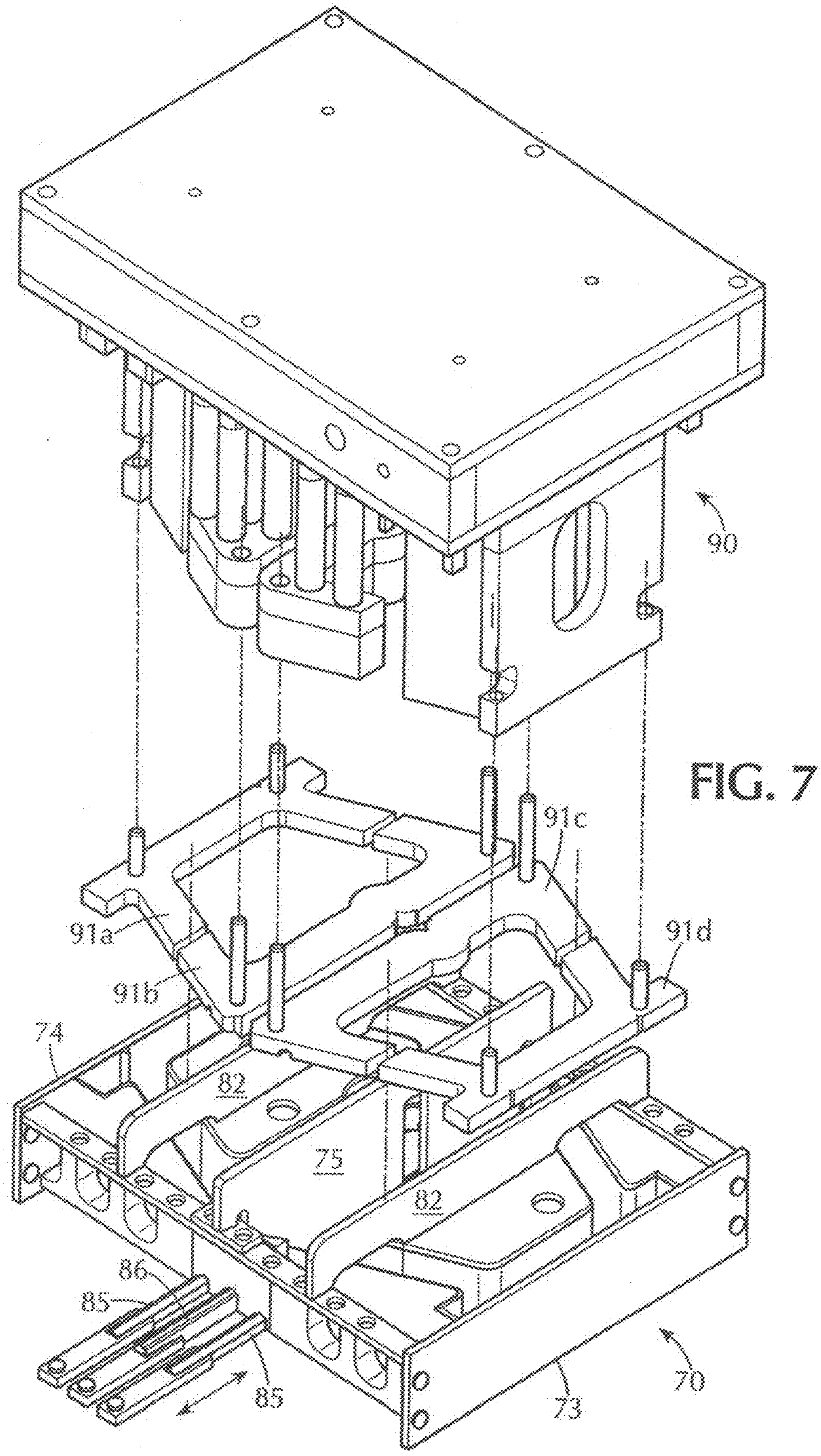
FIG. 7 is an exploded perspective view of principal parts of one embodiment of a mold assembly made in accordance with principles of this disclosure.

As shown in FIGS. 5-7, each mold compartment 76,77 is provided with a core bar assembly which comprises a core bar 82 fixed such as by welding to tabs bolted to the upper edges of the side walls 71,72. Core forms 83 are fixed such as by welding to the core bars 82. The core forms 83 are suspended from the core bars into the mold compartments and have shapes that conform to the shapes of the central through-cavities 50 in the blocks.

Figure 8A:
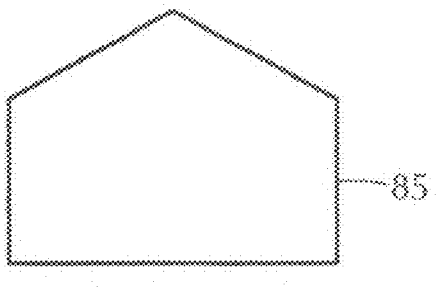
FIGS. 8A and 8B are enlarged explanatory views showing the profiles of the core bars and partition plate illustrated in FIGS. 6 and 7.

As shown in FIGS. 6-7, a groove-forming core bar 85 is slidably insertable in the lateral direction through an opening in the side wall 72 for movement into and out of each of the mold compartments 76,77. When fully inserted into the mold compartments as depicted in FIG. 6, the distal ends of the core bars 85 may abut the side wall 71 or may extend into openings in the side wall 71. As shown in FIG. 8A, each core bar 85 has a shape that conforms to the shape of the groove 20 in the block. That is, the profile of the core bars 85 corresponds to that of the groove 20. In this embodiment, the groove 20 has opposed straight sides which open at one end on the bottom surface 5 of the block and which taper inwardly and converge at the other end.

Figure 8B:
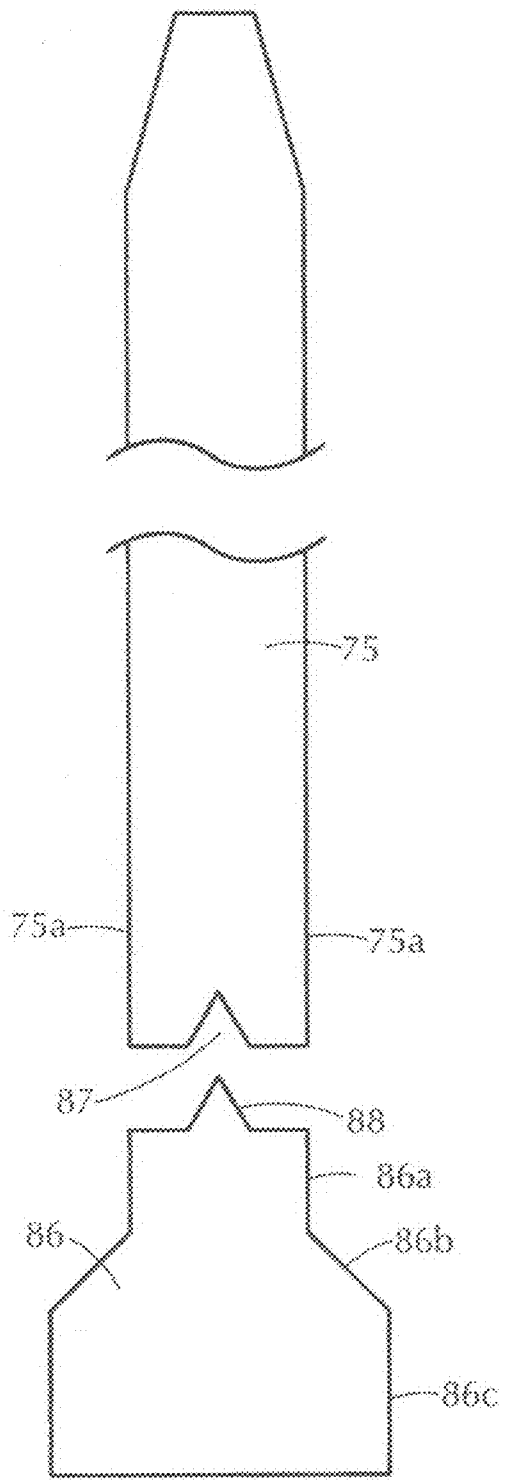

Another core bar 86 is situated directly beneath the partition plate 75 between the two core bars 85. The core bar 86 is slidably insertable through an opening in the side wall 72 and slidably engages with the underside of the partition plate 75. The sliding engagement between the core bar 86 and the partition plate 75 may be implemented by complementarily-shaped male and female parts, one provided on the partition plate 75 and the other provided on the core bar 86. As shown in FIG. 8B, in this embodiment the fixed partition plate 75 has on its underside a female part in the form of a lengthwise extending groove 87 having a generally inverted V-shape, and the core bar 86 has on its upper side a lengthwise extending complementarily-shaped projection 88 having an inverted V-shape. The core bar 86 is mounted to undergo sliding movement into and out of the mold box 70 with the projection 88 in sliding engagement with the groove 87 of the fixed partition plate 75.

The opposite faces 75*a* of the partition plate 75 have a smooth surface which conforms to the smooth front faces of the panels 23,24 of the block. The core bar 86 has opposed upper surface portions 86*a* which are coplanar with the opposed surfaces 75*a* of the partition plate 75 when the core bar 86 is inserted into the mold box and which form the lower portions of the front faces of the panels. The core bar 86 has opposed beveled surfaces 86*b* configured to form the beveled surfaces 23*a*,24*a* along the bottom edges of the panels 23,24, and opposed straight surfaces 86*c* configured to form the straight borders 23*c*,24*c* along the bottom edge portions of the panels 23,24.

As illustrated in FIG. 6, the proximal ends of the core bars 85,86 are secured such as by bolts to a plate of a core puller CP that is mounted on rails, guides or the like (not shown) to undergo reciprocating motion to cause the core bars 85,86 to enter and exit the mold box 70. The core puller may be of a type well known in the industry and is preferably actuated with hydraulic cylinders though can be actuated pneumatically, electrically and/or mechanically according to well-known mechanisms to effect reciprocating motion of the core bars 85,86. During a production cycle, a compression head is positioned above the mold box 70 to apply pressure from above to the concrete mixture loaded into the mold cavities 80 and to assist in discharging the blocks from the mold cavities when the production cycle is completed. FIG. 7 is an exploded view of a compression head 90 and its stripper shoes 91*a*-91*d* (collectively referred to as stripper shoes 91). In FIG. 7, outer portions of the side walls 71,72 have been omitted to expose the inner side wall portions. Though shown in exploded view, the stripper shoes 91 are attached to and form part of the compression head 90. During the production cycle, the compression head 90 is lowered to press the stripper shoes 91 into the open tops of the mold cavities 80. The bottom surfaces of the stripper shoes conform in shape to the corresponding parts of the upper surfaces of the blocks. The compression head 90, except for the configuration of the stripper shoes 91, may be of a type well known in the industry and includes plungers (not illustrated) that can be actuated on completion of the production cycle to lower the stripper shoes 91 through the mold cavities to assist in stripping the blocks from the mold.

Figure 9:
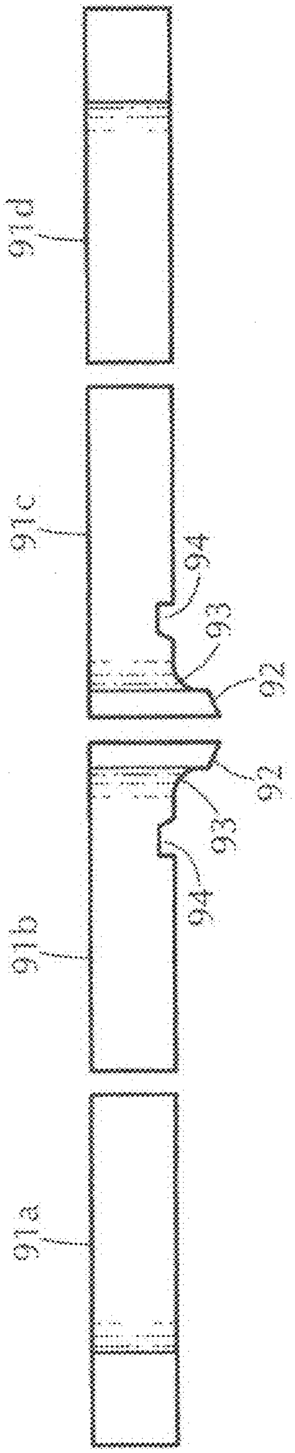
FIG. 9 is a side view of the stripper shoes shown in FIG. 7.

FIG. 9 is a side view of the stripper shoes 91*a*-91*d*. The inner two stripper shoes 91*b*,91*c* form the top front surfaces of the blocks and each has a beveled surface 92 that conforms in shape to the beveled surfaces 23*a*,24*a* along the top edge portion of the block, a curved surface 93 that conforms in shape to the curved edges 23*b*,24*b* along the top corner edges of the block, and recesses 94 (four recesses in this example) that form the four protuberances 12 on the top surface 4 of the block and on the front top surface of the block. During molding, as the compression head 90 is lowered, the stripper shoes 91 exert pressure on the concrete mixture from above to compact the concrete mixture and form the protuberances 12 on the top surface 4 of the block and the curved borders 23*b*,24*b* and the beveled edges 23*a*,24*a* on the tops of the panels 23,24.

When forming two face-to-face non-contacting blocks in a production cycle, a flat production pallet made of steel, plastic, or wood, for example, is positioned beneath the mold box 70 to close the bottoms of the mold cavities 80. After positioning the pallet beneath the mold box 70, the core puller CP is actuated to slidably insert the core bars 85,86 into the mold box 70 to complete formation of the mold cavities 80 (FIG. 6). The opposite faces 75*a* of the partition plate 75 together with the opposed upper surface portions 86*a* of the core bar 86 have shapes that jointly conform to the shapes of the front faces and the front surface portions beneath the front faces of the panels 23,24. The opposed beveled surfaces 86*b* of the core bar 86 have shapes that conform to the shapes of the beveled. surfaces 23*a*,24*a* along the bottom edges of the panels 23,24, and the opposed straight surfaces 86*c* of the core bar have shapes that conform to the straight borders 23*c*,24*c* along the bottom edge portions of the panels 23,24. In accordance with this aspect, opposite side surfaces of the core bar 86 extend into respective ones of the two mold cavities and form the lower front portions of the mold cavities.

In beginning a production cycle, an appropriate amount of concrete mixture from a hopper is loaded, via one or more feed drawers, into the mold cavities 80. The process and equipment for transporting the concrete mixture and loading it into the mold cavities are well known in the art. The concrete mixture in the mold cavities 80 is next compacted or consolidated to densify it. This is accomplished primarily through vibration of the concrete mixture in combination with the application of pressure exerted on the concrete mixture from above by the compression head 90. The vibration can be exerted by vibration of the pallet underlying the mold box (table vibration), or by vibration of the mold box (mold vibration), or by a combination of both actions. The pressure exerted by the compression head is transmitted by the stripper shoes 91 that contact the concrete mixture from above.

The downward pressure exerted on the stripper shoes 91 forms the top surfaces of the blocks, i.e., forms the protuberances 12 on the top surfaces 4 of the blocks and the curved borders 23*b*,24*b* and the beveled edges 23*a*,24*a* on the tops of the panels 23,24. The downward pressure on the concrete mixture also forms, using the mold parts 81, the curved edge portions 23*b*,24*b* at the front corners of the blocks and the beveled edges 23*a*,24*a* at the outer sides of the panels 23,24. If split-shaped blocks are being formed, the mold parts 89 are secured to opposite faces of the partition plate 75 to form the simulated dress joint 25 between the panels 23,24.

The timing and sequencing of vibration and compression is variable, and depends upon the characteristics of the concrete mixture and the desired results. The selection and application of the appropriate sequencing, timing and types of vibrational forces are within the ordinary skill in the art. Generally, these forces contribute to fully filling the mold cavities so that there are not undesired voids in the finished blocks, and to densifying the concrete mixture so that the resulting finished blocks will have the desired weight, density and performance characteristics. After densification, the pre-cured blocks are discharged from the mold assembly. Preferably, discharge occurs by actuating the core puller CP to withdraw the core bars 85,86 from the mold box 70 and thereafter lowering the pallet relative to the mold box while further lowering the stripper shoes 91 through the mold cavities 80 to assist in stripping the pre-cured blocks from the mold. The stripper shoes 91 are then raised upwardly out of the mold box 70 and the compression head 90 is raised in readiness for repeating the production cycle.

The mold assembly has been described with reference to a small pallet machine that uses pallets only large enough to make one pair of blocks each production cycle. This disclosure is not limited to making only two blocks per production cycle and is applicable to what is referred to in the industry as "big board machines" which make four pairs (eight blocks) per production cycle. In the case of big board machines or other machines that make multiple block pairs per cycle, plural pairs of mold cavities are arranged in end-to-end relation with the end walls being formed as division or partition plates between adjacent face-to-face pairs of mold cavities. In such big board machines, the partition plates 70 and the core bars 85,86 are formed from steel bars that are welded to a mold bottom plate referred to in the industry as a drawplate. An advantage of the big board machine is that the core bars are permanently secured to the mold bottom plate and there is no need to reciprocatingly slide the core bars into and out of the mold box.

It will be appreciated by those in the art that obvious changes can be made to the examples and embodiments described in the foregoing disclosure. It is understood that this disclosure is not limited to the particular examples and embodiments disclosed, but is intended to cover all obvious changes and modifications thereof which are within the scope of the disclosure as defined by the appended claims.

We claim:

1. A wall block having spaced-apart front and rear sections interconnected by two laterally spaced-apart side sections that jointly define a through-cavity extending in a top-bottom direction through the wall block from a top face thereof to a bottom face thereof, the front section having a raised panel on its front side, the raised panel having a beveled edge around its entire perimeter, and the beveled edge being surrounded around its entire perimeter by a curved border at its top and both sides and by a front-facing flat border at its bottom.

2. The wall block according to claim 1, wherein the raised panel has a smooth texture front face.

3. The wall block according to claim 2, wherein the front face of the raised panel is raised with respect to the border an amount equal to the thickness of the beveled edge in a front-rear direction.

4. The wall block according to claim 3;
wherein the width of the border is substantially greater than the thickness of the beveled edge.

5. The wall block according to claim 1; further including two or more protuberances protruding outwardly from the top face of the front section frontward of the through-cavity, the protuberances being laterally spaced apart from one another and lying along a straight line, and a groove extending laterally in the bottom face of the front section frontward of the through-cavity, the groove being located and dimensioned relative to the protuberances so that two wall blocks can be stacked one atop another in staggered relation with one or more protuberances of the lower wall block fitted in the groove of the upper wall block and the upper wall block set back with respect to the lower wall block.

6. A retaining wall structure comprising successive courses of wall blocks stacked one atop another with each succeeding course set back relative to its preceding course and with the wall blocks of each course staggered relative to the wall blocks of adjoining courses, each of the wall blocks being constructed according to claim 1.

7. The wall block according to claim 1; wherein the wall block is composed of a concrete mixture.

8. A wall block having spaced-apart front and rear sections interconnected by two laterally spaced-apart side sections that jointly define a through-cavity extending in a top-bottom direction through the wall block from a top face thereof to a bottom face thereof, the front section having a raised panel on its front side, the raised panel being divided into two smaller raised panels of different widths by a groove that extends in the top-bottom direction, each smaller raised panel having a beveled edge around its entire perimeter, and the beveled edge being surrounded around its entire perimeter by a curved border at its top and both sides and by a front-facing flat border at its bottom.

9. The wall block according to claim 8;
wherein each smaller raised panel has a smooth texture front face.

10. The wall block according to claim 9; wherein the front face of each smaller raised panel is raised with respect to the border an amount equal to the thickness of the beveled edge in a front-rear direction.

11. The wall block according to claim 10, wherein in each smaller raised panel, the width of the border is substantially greater than the thickness of the beveled edge.

12. The wall block according to claim 8; further including two or more protuberances protruding outwardly from the top face of the front section frontward of the through cavity, the protuberances being laterally spaced apart from one another and lying along a straight line, and a groove extending laterally in the bottom face of the front section frontward of the through-cavity, the groove being located and dimensioned relative to the protuberances so that two wall blocks can be Stacked one atop another in staggered relation with one or more protuberances of the lower wall block fitted in the groove of the upper wall block and the upper wall block set back with respect to the lower wall block.

13. The wall block according to claim 8; wherein the wall block is composed of a concrete mixture.

14. A retaining wall structure comprising successive courses of wall blocks stacked one atop another with each succeeding course set back relative to its preceding course and with the wall blocks of each course staggered relative to the wall blocks of adjoining courses, each of the wall blocks being constructed according to claim 8.

* * * * *